W. M. McINTYRE.

SPEED PULLEY.

No. 11,495. Reissued May 14, 1895.

Attest
R. H. Young
R. C. Durand

Inventor
William M. McIntyre
by Waller Donaldson & Co
Attys

UNITED STATES PATENT OFFICE.

WILLIAM M. McINTYRE, OF BRADDOCK, PENNSYLVANIA.

SPEED-PULLEY.

SPECIFICATION forming part of Reissued Letters Patent No. 11,495, dated May 14, 1895.

Original No. 510,283, dated December 5, 1893. Application for reissue filed April 12, 1895. Serial No. 545,545.

*To all whom it may concern:*

Be it known that I, WILLIAM M. McINTYRE, a citizen of the United States, and a resident of Braddock township, county of Allegheny, and State of Pennsylvania, have invented certain new and useful Improvements in Speed-Pulleys; and I do hereby declare that the following is a full, clear, and exact description of the invention, which will enable others skilled in the art to which it appertains to make and use the same, reference being had to the accompanying drawings, which form a part of this specification.

My invention relates to improvements in what are known as speed pulleys, by which varying rates of speed may be communicated with a given rate of motion of the shaft with which the pulley is connected.

The object of the invention is to provide an improved device of the above character which shall possess superior advantages with respect to efficiency in operation.

The invention consists in the novel construction and combination of parts hereinafter fully described and claimed.

Figure 1:
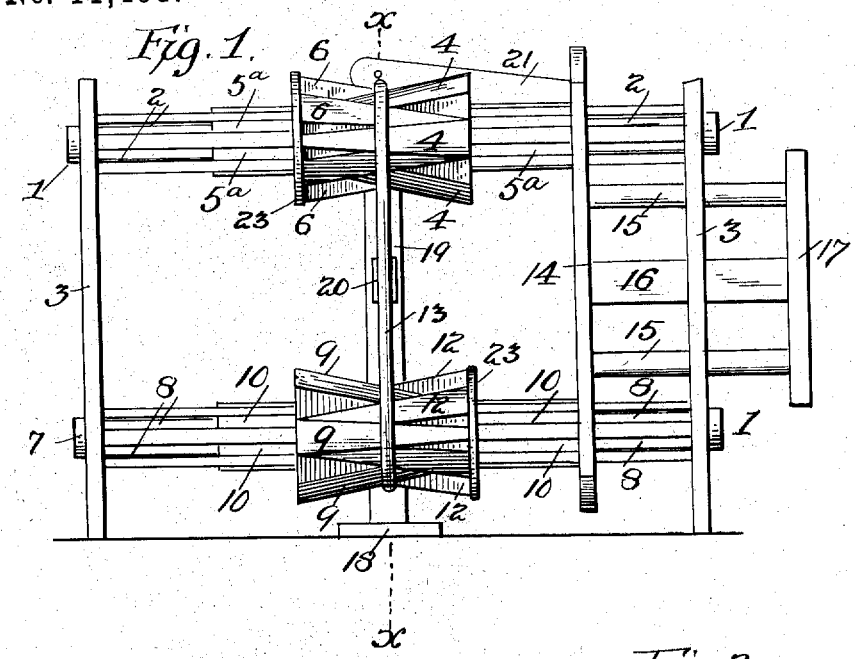
Figure 3:
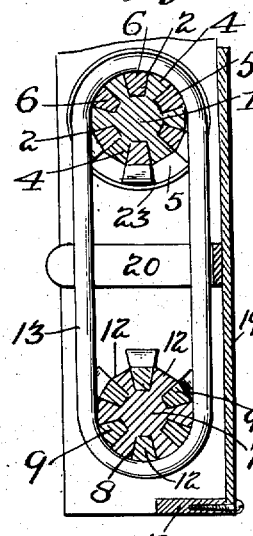
Figure 2:
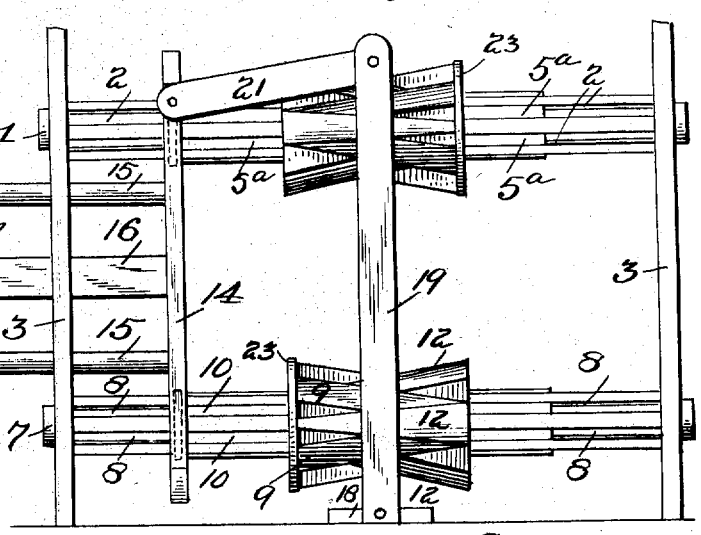
Figure 4:
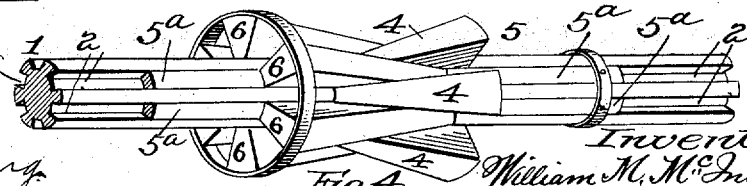

In the accompanying drawings, Figure 1 is a side elevation showing two pulleys constructed in accordance with my invention connected together by a belt and showing means for shifting the slidable parts of the pulleys. Fig. 2 is a similar view looking from the opposite side. Fig. 3 is a cross-section on line $x\ x$, Fig. 1. Fig. 4 is a detail perspective view of one of the pulleys and its shaft.

In the said drawings the reference numeral 1 designates a driving shaft formed with a number of equi-distant horizontal grooves 2. This shaft is journaled in the frame of a machine, or in the standards or hangers, as may be required. In the present instance it is shown as having its bearings in standards 3. Fixed to the shaft is a series of triangular shaped segments 4, with alternating spaces 5, which register with grooves in the shaft. Located in the grooves in the shaft are slides $5^a$, provided with similar segments 6. There are thus formed two cone shaped parts, divided into sections, the cones pointing in opposite directions, and the segments of one fitting and slidable in the spaces between the other cone or part.

Located below the shaft 1, is a similar shaft 7, having horizontal grooves 8. Fixed to this shaft are segments 9, forming a cone similar to that above described, and in the grooves in the shaft fit and work slides 10, provided with segments 12, arranged to slide in the spaces between the segments 9. The two pulleys above described are connected by a belt 13.

One end of each of the slides $5^a$ and 10, is connected with or secured to a standard 14. This standard has apertures near each end through which the said shafts pass and is horizontally slidable or movable thereon. Secured to this standard are guide rods 15, and a supporting bar 16, which pass through holes in one of the standards 3, and are connected together by a bar 17.

Pivoted to the machine frame or base 18, is a lever 19, provided intermediate of its ends with arms 20, which embrace the belt 13. To the upper end of this lever is pivoted one end of a connecting bar, 21, the other end of which is pivotally connected with the sliding standard 14. The outer ends of the movable segments are connected by a band 23.

The operation will be readily understood. When it is desired to vary the speed of the driven pulley, the lever 19 is moved to the right or left, which will actuate the standard 14, which in turn will move the cones comprising the pulleys in or out. Supposing, for instance, it is desired to increase the speed of the driven pulley, the lever, Fig. 1, is turned to the right, causing the standard 14 to be moved outward or away from the cones, and the slides 10 to be correspondingly moved, thereby increasing the circumference of the driving pulley. At the same time the slides of the lower pulley will be operated to decrease the circumference of this pulley. To accomplish this object it is necessary that the points of the sliding segments of one shaft should point in a direction opposite to the points of the segments of the other shaft. By this construction, although the slides of both shafts move in the same direction, yet the circumference of one pulley will be increased, while the other is decreased, and vice versa. It will be seen that this reversed arrangement of the sliding segments is very essential to the successful operation of the pulley as it provides for the perfect alignment of the belt and of the pulleys with each other regardless of the adjustment made, and there is no change in the tension on the belt as would occur were the sliding sections in line with each other, in which case the belt bearings would be thrown out of line on each adjustment of the parts of the pulleys and the tension on the belt be varied to a corresponding degree. It is also very necessary that the segments so interlock as to form a continuous bearing surface for the belt in order to maintain the same tension at all times, which would necessarily vary with segments having spaces between varying in width.

Having thus described my invention, what I claim is—

1. A speed varying device consisting of two pulleys, each of said pulleys comprising two interlocking parts, one fixed and the other slidable, in each pulley, said slidable parts being reversely arranged to each other and a connection belt, substantially as described.

2. A speed varying device consisting of two pulleys each comprising two interlocking parts, one fixed and the other slidable, in each pulley, said slidable parts being reversely arranged to each other, a slidable standard, connections from said standard to each of the slidable parts of the pulleys operating means for the said standard, and a connecting belt, substantially as described.

3. The combination with a shaft formed with a series of horizontal grooves, and one series of segments secured to said shaft with spaces between aligned with the grooves in the shaft, of the slides fitting in said grooves and provided with another series of segments working in said spaces, substantially as described.

4. The combination with the shafts having horizontal grooves therein, the segments fixed to said shafts, the oppositely arranged movable segments, the slides fitting in said grooves with which said movable segments are connected, forming upper and lower pulleys, and the belt connecting said pulleys, of the horizontal movable standard to which said slides are secured, the guide rods and supporting bar, the lever, the shifting arms, and the connecting bar, substantially as described.

WILLIAM M. McINTYRE.

Witnesses:
JNO. KENNEDY,
JESS E. HILL.